United States Patent [19]

Pyzik et al.

[11] Patent Number: 4,834,938

[45] Date of Patent: May 30, 1989

[54] METHOD FOR MAKING COMPOSITE ARTICLES THAT INCLUDE COMPLEX INTERNAL GEOMETRY

[75] Inventors: Aleksander J. Pyzik, Midland; Jack J. Ott, Hemlock; Scott J. Jankowski, Midland, all of Mich.

[73] Assignee: The Dow Chemical Company, Midland, Mich.

[21] Appl. No.: 185,678

[22] Filed: Apr. 25, 1988

[51] Int. Cl.$^4$ .................................................. B22F //00
[52] U.S. Cl. ............................................. 419/6; 264/56; 264/60; 264/DIG. 36; 264/340; 419/14; 419/17; 419/27
[58] Field of Search .............................. 419/6, 10-19, 419/27; 264/56, 60, DIG. 36, 340

[56] References Cited

U.S. PATENT DOCUMENTS

| | | | |
|---|---|---|---|
| 3,929,476 | 12/1975 | Kirby et al. | 419/27 |
| 3,973,061 | 8/1976 | Easwaram et al. | 419/27 |
| 4,470,953 | 9/1984 | Bruce | 419/27 |
| 4,720,371 | 1/1988 | Shirley | 419/27 |

*Primary Examiner*—Stephen J. Lechert, Jr.

[57] ABSTRACT

A process is described for making a composite article without shrinkage, particularly of ceramic and metal wherein the article includes complex internal surfaces or cavities. The process requires forming an insert body that includes an external surface that corresponds to an internal cavity of the article. The insert body consists of a material having a melting temperature less than that of the article. The process further requires forming a porous compact about the insert body wherein the compact is formed into the substantially the net shape of the article. The compact is made of a material that is wetted by liquid insert material and has a sintering temperature greater than the wetting temperature of the insert material. The process further requires heating the article to a temperature such that the inserts substantially melts and infiltrates the porous compact forming the finished composite article. The process produces products including complex internal surfaces without the necessity of costly and sometimes technically difficult internal machining operations.

13 Claims, No Drawings

METHOD FOR MAKING COMPOSITE ARTICLES THAT INCLUDE COMPLEX INTERNAL GEOMETRY

BACKGROUND OF THE INVENTION

This invention relates to densified composite articles, such as those made of ceramic-metal compositions, and methods of forming such articles. More particularly, the invention relates to such composite articles that include hollows or cavities of complex geometry and methods of formation whereby machining of internal surface is not required.

Making composite articles of ceramic-metal, metal-metal or ceramic-glass materials often involves formation of a porous compact of the materials followed by a densification process such as, for example, sintering or hot isostatic pressing. Densification processes typically result in considerable shrinkage of the porous compact as it increases from 50-60 volume percent to 80-100 volume percent of complete or theoretical density. Densification processes also tend to distort article dimensions and result in many reject pieces that do not have the desired finished or net shape of the article.

The difficulty of achieving a dimensionally predictable and acceptable finished composite article of desired net shape is particularly acute for articles that must include an internal surface or cavity or hollow portion, particularly if the cavity comprises complex internal geometry. Such articles might comprise, for example, a tube, a tube shape having a variable internal diameter or a hollow ball.

In the past, cavities in composite articles often have been made by boring out a capillary or passageway in the sintered article, followed by machining where variable diameters or other complex surfaces are required. Articles having completely enclosed cavities or hollows are typically made by forming the articles in separate sections followed by joining or welding the sections together to form the whole.

These prior art techniques are expensive and often technically difficult, particularly where internal working space is limited. Where the materials of which the articles are made are very hard, such as for many ceramics, even simple borings may become exceedingly difficult and expensive.

As an alternative to sintering or hot pressing, ceramic-metal composites may be densified to form by infiltrating the metal into a porous ceramic compact. Thus, Stibbs et al. in U.S. Pat. No. 3,749,571 describes infiltrating silicon into a boron carbide compact. While a density of 99 percent of theoretical density was said to be achieved, a necessary sintering step still results in shrinkage of the article. Gazza et al. in U.S. Pat. No. 3,864,154 describe making a solid composite, such as a simple disk, of various ceramicmetal materials by surrounding a ceramic compact with powdered metal followed by heating until molten metal impregnates the ceramic skelton. Landingham in U.S. Pat. No. 3,718,441 achieves a degree of densification of a beryllium oxide compact of simple cylindrical geometry by reducing oxide films present on metal powders that are said to prevent metal from wetting the ceramic during sintering operations. Excess metal must then be machined off.

The focus of this earlier work was simply to achieve densification. The articles of interest were not complexly shaped articles having internal cavities. Thus, neither internal shrinkage nor internal machining to net shape was of significant concern.

Where more reactive combinations of materials, such as $B_4C$ and $Al$, are of interest and as infiltration process is employed, one often must balance the infiltration process with kinetics of potential chemical reactions that form ceramic phases that may interfere with densification by blocking infiltration channels in the porous compact. In order to achieve infiltration and, consequently, desired densification, Pyzik et al. in U.S. Pat. No. 4,707,770 reduce reaction rates of a $B_4C$-$Al$ system by thermally treating $B_4C$ at about 1800° C. prior to metal infiltration of the porous compact. Halverson et al in U.S. Pat. No. 4,718,941 employ a chemical treatment over a prolonged time period to allow infiltration. These material treatment techniques, of course, add cost to the composite article. Most of these densification techniques also involve later sintering steps that cause significant shrinkage of the final products. Consequently, heretofore, infiltration has achieved no advantage over hot pressing in producing net shape composities.

The properites of composites have improved as the ability to produce near fully densified and pore-free articles has progressed. It is now possible to realize the potentials of combining the properties of the materials, such as ceramics and metals. It is now desirable to focus upon producing densified composite articles of a geometric complexity that meet the functional demands of suitable applications that are now evident from the improved properties of the composite materials. There is a need to produce composite articles that are dimensionally precise yet include complex geometry, such as internal cavities and the like. It is desirable to produce such articles in a fully densified, "net shape" form, that is, without significant shrinkage and, thus, completely finished without the need for further shaping, such as by machining.

SUMMARY OF THE INVENTION

The present invention is a substantially shrinkage-free process for making a composite article of ceramic-metal, metal-metal, ceramic-glass materials or the like, where the article include complex internal surfaces, such as a bore, a partially enclosed cavity or even a totally enclosed cavity. The process achieves densities above 99 percent of theoretical by means of an infiltration technique which surprisingly does not require thermal or chemical pretreatment of reactive ceramic-metal materials, such as $B_4C$-$Al$. The infiltrated articles is heat treated at less than sintering temperatures such that article shrinkage is substantially eliminated. Thus, distorted internal geometry and internal machining, typical of the prior art, are substantially eliminated in the production of net shape, densified ceramic-metal and the like composites. Further, the process in an infiltration process that avoids the need to pre-treat materials in order to achieve successful infiltration.

The process requires forming an insert body that includes an external surface that corresponds to an internal surface or cavity of the article. The insert body consists of a material that has a wetting temperature less than that of the finished article. The process further requires forming a porous compact about the insert body wherein the compact is formed into substantially the net shape of the desired article. The compact is made of a material that is wetted by the insert material and has a sintering temperature greater than the wetting temperature of the insert material. The process then requires heating the assembled porous compact and insert body to the insert material wetting temperature such that the insert substantially melts and the insert material infiltrates into the porous compact, forming the finished compact article.

The invention includes articles made by the above-described process, particularly those articles having internal surfaces that are substantially enclosed, and hollow articles. Such an article is, for example, a ceramic-metal composite that is a hollow ball or the like.

In a preferred process of the invention, the insert body material is a metal or glass and the porous compact material is a ceramic or metal. The compact-insert materials may be, for example, $AlB_{12}$-Al, $B_4C$-Si, SiC-Si, $SiB_6$-Al, $SiB_4$, $B_4C$-Mg, $TiB_2$-Ni, $Al_2O_3$-Al-Mg, and $TiB_2Al$. Ceramic-glass systems include, for example, $Al_2O_3$-($SiO_2$-$B_2O_3$ glass), $Si_3N_4$-($SiO_2$-MgO glass), $Si_3N_4$-($SiO_2$-MgO-$Y_2O_3$-CaO glass), $Si_3N_4$-($SiO_2$-$Y_2O_3$glass) and $Si_3N_4$($SiO_2$-$Al_2O$Metal-metal systems include, for example, Ti-Mg or W-Cu.

In a preferred embodiment of the invention, the process includes an insert body material that is a metal and a porous compact material that is a ceramic. Most preferred, are chemically reactive systems, such as $B_4C$-Al or $B_4C$-Al alloys, that react at elevated temperature. In these chemically reactive systems the metal component, after infiltration, can be depleted to form ceramic phases that modify article properties such as hardness and wear resistance.

The process of the invention may be utilized to produce articles in which the insert material infiltrates and fills all of the pores of the porous compact. Alternatively, only a portion of the pores of the porous compact or only pores adjacent internal surfaces of the compact might be filled. Thus, the process of the invention allows substantial flexibility for tailoring composite properties to local adverse conditions such as corrosion, wear or the like.

DETAILED DESCRIPTION OF THE PREFERRED EMBODIMENTS

The process of the invention is particularly useful for forming composite articles that have complex internal geometry, such as partially or totally enclosed cavities or surfaces. Articles having intricately shaped passages or capillaries or hollow portions or hollow balls may be made, for example. The process permits the formation of hollow net-shape articles in one piece. In contrast to the prior art, wherein ceramic-metal composites typically undergo considerable shrinkage through sintering.

A composite article of the invention comprises two or more solid phases of ceramic or metal. The process if particularly useful for forming ceramic-metal composites. Different metals forming a metal-metal composite, as well as ceramic-glass systems may be combined to produce composite articles of the invention.

The process of the invention, in concept, requires forming an insert body of relatively low melting point material wherein the body has an external surface that is the net shape of the desired cavity of the composite article. A porous compact is then formed about the inert body. The assembled compact and insert body are heated to the melting point of the insert body material such that the low melting point material infiltrates into the porous compact. Once the insert material is fully depleted or absorbed into the compact, the article is complete and includes the desired net shape cavity.

Criteria for selecting suitable materials for the process of the invention, aside from the requirements of the functioning of the article or of the system in which the composite will function, first of all require that the materials have different melting temperatures. A second criterion is that the lower melting temperature solids phase must "wet" the other material, at a wetting temperature that is below the sintering temperature of the higher melting temperature other material. The wetting temperature is equal to substantially the melting point of the lower melting temperature material. That is, when the lower melting material reaches its liquid state, it is characterized by a low contact angle of less than about 45°, preferably less than about 10°, on the phase remaining solid. (See Halverson, et al., U.S. Pat. No. 4,615,440 and Pyzik et al., U.S. Pat. No. 4,702,770 for discussions of wetting). The essential result required is than when the materials are in contact one with the other and heated to the wetting temperature of the lower melting temperature component, said component will wet and infiltrate a porous compact object made of a higher melting point material, before the higher melting temperature component begins to shrink and pores close.

A third, but optional, criterion for ceramic-metals systems is that the system be chemically reactive. Such a system is particularly versatile because, after infiltration, a metal phase may be depleted to form various ceramic phases. Proper selection of conditions produces certain ceramic phases, the selection of which allows tailoring of physical properties to particular use requirements. For example, properties such as hardness or wear resistance may be improved by continued heating of the composite article to appropriate temperatures, causing desired reactions and ceramic phases to form.

Typically, the insert body is constructed of metal or glass with the intention that the insert materials will infiltrate into a ceramic or metal porous compact. The insert body is made by any convenient conventional process such as, for a metal, by casting or machining. The insert may be a solid or hollow object but must have an external surface that corresponds to or is the mirror image of the desired cavity or internal surface of the finished composite article. For example, a suitable metal insert might be a solid cylinder having external surfaces machined to the desired finished cavity shape and dimensions.

The volume of material of which the insert is made is limited to that amount of material desired to be absorbed into the porous compact. Where the insert body is too small to provide a sufficient volume of material, a series of conduits or the like may be extended into the cavity to add material during the infiltration process.

Making the porous compact of ceramic or metal material about the insert body is likewise accomplished by conventional techniques. The ceramic materials are typically appropriately sized and formed into a homogeneous mixture with a binder. The material may then be consolidated by some convenient method such as assembling the insert and ceramic material in an appropriately shaped die and subjecting the assembly to cold isostatic pressing or the like.

The density of the resulting porous compact will depend upon the ability of the ceramic particles to pack and usually is on the order of about 50–70 volume percent of theoretical full density. The particle size and form of ceramic particles will affect porous compact or green body characteristics as well as finished product qualities. For example, if the ceramic component is in the form of whiskers, a density of 40 to 50 percent may be obtained. The finished composite will have a high whisker content, which is very difficult to achieve by applying other techniques. Other physical forms of the ceramic material such as particulates, platelets, fibers, chopped fibers, or the like, may be selected to achieve particular desired results.

The assembly, consisting of the metal or glass insert surrounded by the porous ceramic or metal compact is heated to the wetting temperature at which the insert material substantially melts and infiltrates the porous compact. It is a requirement of the system that the sintering temperature of the porous compact be higher than the wetting or melting temperature of the insert. It is desired that the process be conducted below those temperatures at which there is significant pore closing of the porous body. The intent is that all pores and their interconnecting channels of the porous compact remain open during the infiltration process so that they may fill with metal producing a desired net shape article, without the shrinkage which occurs at sinterint temperatures. As the wetting temperature is achieved, the insert material liquifies and is drawn into the porous body by means of capillary action of the compact pores. The infiltration continues until all of the insert body material is absorbed, leaving behind a cavity having the desired net shape. The heating and infiltrating step may be conducted under vacuum, inert gas or air as the system requires.

Depending upon article geometry and volume of the insert body, additional amounts of liquid-phase material may be required to fill all of the voids in the porous body. Additional liquid may be introduced from external sources as necessary by whatever means convenient. Alternatively, the volume of the insert body may be limited such that the characteristics of the finished composite article will vary radially from the surface in contact with the insert. Limiting the volume of material available for infiltration allows forming a structure wherein some article property of interest is graded with respect to article geometry.

Once infiltration is complete, the composite article may be cooled to room temperature. The finished article dimensions are substantially unchanged from the porous compact before infiltration and thus typically require no further processing. Articles that differ in dimensions by no more than 0.002 inch (50.8 micrometers) or less from compact to finished article are typicaly achieved.

The finished composite article of reactive systems may be subjected to further heat treatment in which the metal phase, for example, is reacted to form new ceramic phases. Such heat treatment processes often increase hardness and wear resistance in article surfaces. For example, a composite $B_4C$-Al system cermet produced by the infiltration process of this invention is readily altered in microstructure by means of the optional additional heat treatment.

As noted above, the process of the invention permits formation of composite articles that may include properties that vary from surface-to-surface to meet specific environmental or use requirements of each surface. For example, in a reactive system such as boron carbide and aluminum or aluminum alloys, a fully dense, multi-ceramic phase article may be produced having such variable properties. Such an article may include exterior surfaces of complex geometry as well as complex interior surfaces or cavities, each surface treated through either infiltration or metal or post-heat treatment to achieve desired surface properties.

The interior surface of each an article is, for example, prepared by machining an aluminum or aluminum alloy cylinder to include an exterior surface that is the net shape of the desired interior surface or cavity of the desired composite article. The cylinder insert body is then bored or otherwise treated to limit the amount of metal available for infiltration to just that amount necessary to form a thin ceramic-metal layer adjacent the interior surface or cavity of the finished composite article. Particulate $B_4C$ is combined with a binder and cold pressed in a die about the insert body, wherein the die includes complex surfaces constituting the desired exterior surfaces of the composite article. The porous compact-insert assembly is elevated in temperature to the wetting temperature of the aluminum or aluminum alloy insert and held at that temperature until the insert material has liquidified and infiltrated the interior surface of the porous compact. At that point, the partially infiltrated boron carbide compact could be elevated in temperature between 700° to 1200° C. to react the aluminum metal with the boron carbide ceramic to form new ceramic phases having the desired high hardness qualities for the composite article interior surfaces.

The partially infiltrated compact may then be treated to alter the exterior properties of the article by contacting the exterior with a second metal at its wetting temperature. After the second infiltration, the composite article is characterized by a hard ceramic interior and a tough ceramic-metal exterior. The metals, of course, may differ for each infiltration, depending upon desired finished qualities. The second infiltration could also be followed by a heat treatment where new ceramic phases in the exterior are also desired.

The process of the invention has the capability of producing many unusual shapes. As noted above, hollow balls or other such hollow shapes may be made. It may be desirable to include materials or objects in a hollow that remain in place during infiltration. Such material might comprise a skeletal support for the cavity or simply a material that requires cermet encapsulation, for example. Such forms are achieved by including the material to be encapsulated, in their desired shape, as a component of the insert body. The materials to be left in the cavity after infiltration must not be wetted by the insert body material at infiltration temperature. Such non-wetting character may require a chemical surface treatment or the like of the materials to be left in the cavity.

As noted above, prior workers found that infiltration of some ceramic-metal systems, such as $B_4C$-Al, were significantly improved where the ceramic phase is subjected to a thermal or chemical treatment. In U.S. Pat. No. 4,718,941 the problem was described as a requirement to remove oxide layers from the $B_4C$ powder prior to infiltration. This process involved exceedingly lengthly treatment periods of about 10 days. It has been discovered that the oxide contamination problem that interferes with infiltration appears to be solved by the present process without the necessity of either prior art treatment.

It appears that oxide removal may be more critical for the metal surfaces than for the ceramic material. Thus, in the $B_4C$-Al system of interest, while it may be more difficult to remove oxide form Al than it is to remove oxides from $B_4C$, the problem is reduced to insignificance because the infiltration process of the invention utilizes the metal phase in the form of a relatively massive insert body. The Al phase is in the form of a rod, a shaped block, a plate, or the like, not in particulate form. Consequently, the surface area of the metal and, hence, oxide content of the systems is at a reduced level and does not appear to interfere with infiltration.

The following examples illustrate the invention.

EXAMPLE 1

An insert body of aluminum was made consisting of a rod machined to include helical threads on its cylindrical surfaces. A ceramic phase mixture was prepared by mixing boron carbide powder (ESK 1500, manufactured by Elektroschemeltzwerk Kempten of Munich, West Germany) with 3 percent by weight of a wax binder for 3 hours and then passing the mixture through a 220 micrometers sieve. The ceramic powder mixture was placed in a rubber die, such that the powder surrounded the metal insert, and isostatically pressed at 45 ksi (310 MPa) for 1 minute. The pressure was then released and the porous compact-insert body assembly was removed from the rubber die and placed into a graphite furnace. A vacuum of 1–100 milliliters was applied at room temperature. The temperature was elevated at 10° C. per minute to 1170° C. and held for 1 hour. The article was then cooled down to room temperature under flowing argon. The properties of the resulting composite article included a fracture strength of 81 ksi (558 MPa), a fracture toughness $K_{IC}$ of 7.9 MPa.m$^{1/2}$ and a hardness of 695 kg/mm$^2$. The finished composite article was characterized by dimensions that differed by only 0.001 inch (25.4 micrometers) when compared to the size of the porous compact. The finished article was fully densified and included no detectable pores.

A second article according to the above-described process was made and subjected to a heat treatment wherein the composite article was cooled down to 800° C. and held for 10 hours. The properties of the composite article after heat treatment included a fracture strength of 77 ksi (530 MPa), $K_{IC}$ of 5.8 MPa.m$^{1/2}$ and a hardness of 1295 kg/mm$^2$.

Carefully controlling the heating schedule as the infiltration temperature is approached improves the infiltration process of the invention. For the B$_4$C-Al system of interest, a heating rate of less than about 10° C./min from 1000° C. to 1100° C. and less than about 5° C./min from 1100° C. to a maximum desired temperature is particularly suitable. Heating at maximum temperature generally requires about 15 minutes plus 10 minutes for each 1 cm which the liquid phase needs to penetrate (where such distances do not exceed about 10 cm). Materials are fully dense and show excellent mechanical properties under these conditions.

A series of composite articles, made in accord with the above-described process, include the ranges of properties shown in the following table.

TABLE

Properties Ranges for B$_4$C—Al Composition Articles

| Heat Treatment After Infiltration | Fracture Strength [Ksi (MPa)] | Fracture Toughness [MPa·m$^{\frac{1}{2}}$] | Hardness [kg/mm$^2$)] |
|---|---|---|---|
| None | 70–90 (480–620) | 6–9 | 500–700 |
| 800° C. for 10 hours | 60–80 (414–550) | 5–7 | 1100–1400 |

EXAMPLE 2

An aluminum cylindrical rod 8.00 inches long and 0.50 inches in diameter (20.32 centimeters long and 1.27 centimeters in diameter) was selected as the insert body for preparation of a TiB$_2$-Al tube. TiB$_2$ powder, characterized by an average particle size of 7 micrometers and supplied by Union Carbide was mixed with a wax binder in rotary mixer and isostatically cold pressed at 60 ksi (420 MPa) around the aluminum rod insert. The TiB$_2$ porous compact-Al insert body assembly was then heated under vacuum to 1250° C. and held at that temperature for 1 hour. After cooling, the finished composite article was 99 percent of theoretical density and required no machining to meet the required dimensions of 0.50±0.002 inches (1.270±0.005 cm).

We claim:

1. A process for making a composite article having an internal surface or cavity, comprising:
   (a) forming an insert body, said body having an external surface that corresponds to said internal surface of said article, said insert body consisting of a material that has a wetting temperature less than that of said article;
   (b) forming a porous compact about said insert body, said compact formed into substantially the net shape of said article, said compact made of a material wetted by said insert material and having a sintering temperature greater than the wetting temperature of said insert material; and
   (c) heating said article to said wetting temperature such that said insert material substantially melts and infiltrates said porous compact, forming said opposite article having substantially the net shape of said compact.

2. The process of claim 1 wherein said insert body material is a metal or glass and said porous compact material is a ceramic or metal.

3. The process of claim 2 wherein said compact-insert materials are ceramic-metal materials selected from the group consisting of B$_4$C-Al, B$_4$C-Si, TiB$_2$-Al, TiB$_2$-Ni, B$_4$C-Mg, AlB$_{12}$-Al, SiB$_6$-Al, SiB$_4$-Al and SiC-Si.

4. The process of claim 2 wherein said compact-insert ceramic-glass materials are Al$_2$O$_3$-(SiO$_2$-B$_2$O$_3$ glass), Si$_3$N$_4$-(SiO$_2$-MgO glass), Si$_3$N$_4$-(SiO$_2$-Y$_2$O$_3$ glass), Si$_3$N$_4$-(MgO-Y$_2$O$_3$-CaO-SiO$_2$ glass), or Si$_3$N$_4$-(Al$_2$ glass).

5. The process of claim 2 wherein said compact-insert metal-metal materials are Ti-Mg or W-Cu.

6. The process of claim 1 wherein said insert body material is a metal and said compact material is a ceramic and said metal and ceramic are reactive at elevated temperature.

7. The process of claim 6 wherein said ceramic metal materials are B$_4$C-Al or B$_4$C-Al alloys.

8. The process of claim 6 or 7 wherein, after said insert material infiltrates said compact, the temperature of said article is adjusted such that said metal and ceramic react to form metal-ceramic phases.

9. The process of claim 1 wherein, upon heating, said insert material infiltrates and fills all pores of said porous compact.

10. The process of claim 1 wherein, upon heating, said insert material infiltrates and fills a portion of the pores of said porous compact.

11. The process of claim 10 wherein, upon heating, said insert material is limited in amount such that it fills all pores of said compact but only adjacent said internal surface of said compact before said insert material is depleted.

12. The process of claim 1 wherein said heating step proceeds incrementally to said wetting tempeature and is held at said temperature until infiltration is complete.

13. The process of claim 12 wherein said ceramic-metal materials are $B_4C$-Al or $B_4C$-Al alloys and said heating proceeds at about 10° C./min from about 1000° to 1100° C. and at about 5° C./min from 1100° C. to the maximum desired temperature of about 1200° C.

* * * * *